Nov. 15, 1938.  J. S. DUNN  2,136,735
VISUALIZING DIOPTERMETER
Filed Dec. 8, 1937
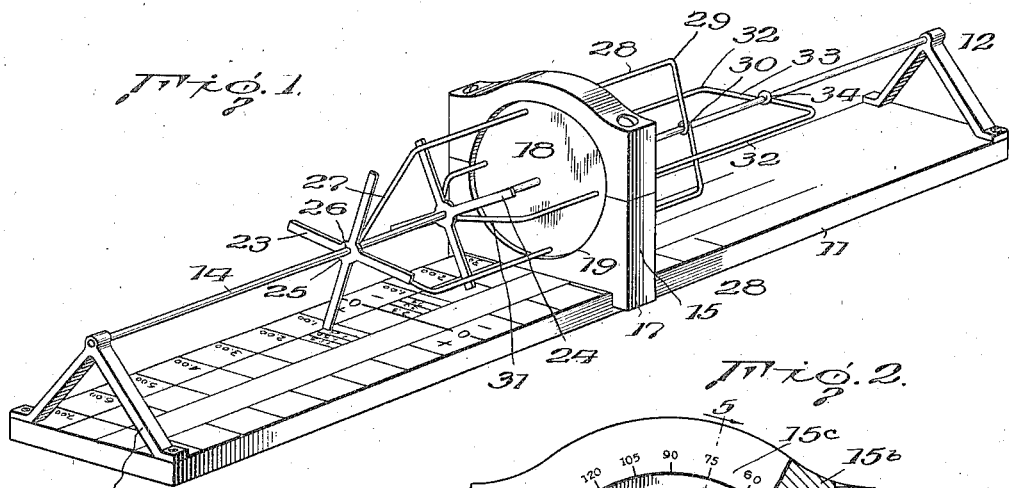
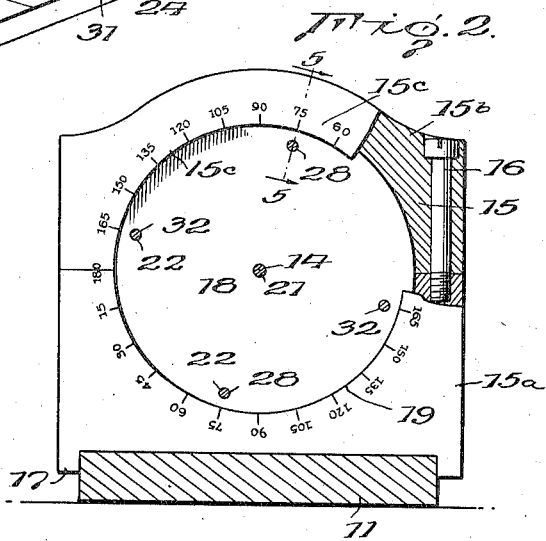
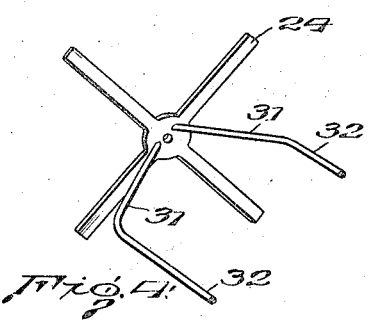
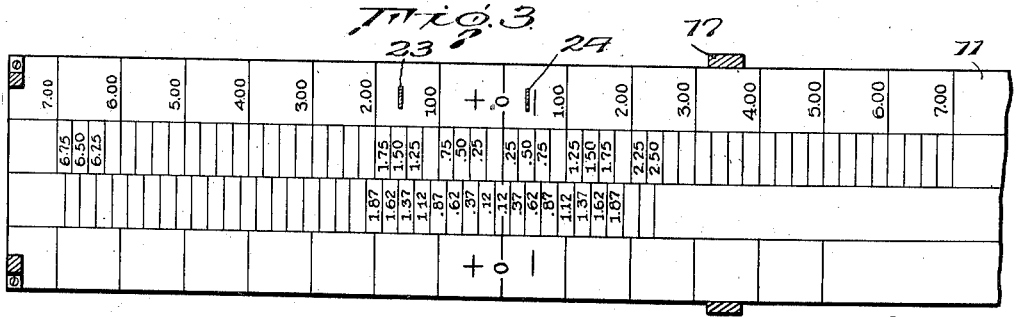
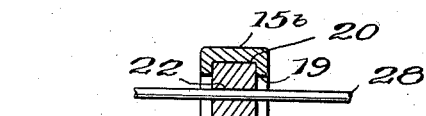
Inventor
John S. Dunn,
By Church & Church
His Attorneys Patented Nov. 15, 1938

2,136,735

UNITED STATES PATENT OFFICE 2,136,735

VISUALIZING DIOPTERMETER

John S. Dunn, New Orleans, La.

Application December 8, 1937, Serial No. 178,812

9 Claims. (Cl. 35—17)

This invention relates to visualizing dioptermeters, that is, to devices for demonstrating the refractive errors of the human eye, the refractive effect of lenses for correcting such errors for computing combinations of a plurality of values of refractive corrections, and for transposing lens prescriptions of one combination of correction values to a different but equivalent combination of correction values, as well as for use in checking whether the curvature of a lens, as measured, corresponds to the prescription therefor.

One of the objects of the invention is to provide a device for demonstrating to a patient or student, after the refractive errors of an eye have been measured and the spherical and/or cylindrical values necessary for correction thereof have been determined, the physical condition existing in the eye and the exact location of the focal points of the two principal rays relative to the retina, so that the patient may visualize the condition and the effect of lenses in compensating for the errors. A further object of the invention is to provide a device by which a prescription for a compound lense of one form may be transposed to a prescription for an equivalent compound lens of another form, such as, for instance, the transposition of the combination of a plus spherical correction and a minus cylindrical correction to the equivalent combination of a minus spherical correction and a plus cylindrical correction. A further object of the invention is the provision of a device of this type by which the various diopter values and axis values will be algebraically added or determined. Still further objects and features of the invention, as well as the manner of practicing the invention will be apparent from the following specification, when read in conjunction with the accompanying drawing, in which:—

Fig. 1 is a view in perspective of a structure embodying the invention;

Fig. 2 is an enlarged view in transverse section, showing the slider in elevation;

Fig. 3 is a fragmentary plan view of the base, showing the diopter scale;

Fig. 4 is an enlarged fragmentary view in perspective of one of the parts; and

Fig. 5 is a fragmentary sectional view, taken on line 5—5 of Fig 2.

In the embodiment of the invention shown in the drawing, a base 11 of uniform width is provided on its upper surface with a diopter scale having a zero (0) line R and uniformly spaced gradations extending in each direction therefrom and marked, respectively, "+" and "—". At one side of the longitudinal center line, I prefer to indicate the divisions of each diopter by quarters, and on the other side of the center line by eights, but it will be appreciated that such divisions may be indicated in any suitable way. Upstanding brackets 12 and 13, at the ends of the base 11, support a guiding wire or rod 14 spaced parallel to, and above, the longitudinal centerline of the base.

An upright, transversely-extending slider 15 is provided which can be moved along the upper face of the base 11, and is preferably formed of a lower portion 15a and an upper portion 15b detachably secured to the lower portion by screws 16 which extend downwardly through the side edges of the portion 15a into the base portion, as shown in Fig. 2. Downwardly extending arms or lugs 17 on the lower portion 15a are provided to engage the side edges of the base 11 and thereby maintain the slider perpendicular to the base as it is moved endwise of the base. A rotator, preferably in the form of a disc 18, is rotatably mounted in the slider 15, the complementary lower and upper portions thereof being formed with a large circular opening 19, provided with an annular channel 20 about such opening and in which the disc 18 is rotatably mounted, as shown in Fig. 5. An opening 21 is formed at the center of the disc 18 to slidably receive the wire or rod 14, and four openings 22 are provided near the periphery of the disc 18, being spaced 90° from each other for a purpose which will be later described. The slider 15 is provided, on at least one face, about the opening 19, with a scale 15c having degree graduations increasing from 0° to 180°, and again from 0° to 180° in a counter-clockwise direction, as shown.

Two focus indicators are provided which are slidable relative to each other as well as to the disc 18 and the rod 14, but are guided by such disc and the rod 14. The indicator 23, which is termed the forward indicator because more remote from the slider 15, is shown as shaded to indicate the color green, while the other, or rear, indicator 24 is indicated as white, such indicators being substantially identical in construction. The indicator 23 has four arms defining a plane perpendicular to the rod 14 having a central portion 25 provided with an opening 26 in which the rod 14 is slidably received, the arms being of such length as to reach almost to the graduated scale on the base 11, to facilitate the setting of the indicator and the reading of the scale that corresponds to its position. To the indicator 23 there is secured a loop of wire, comprising portions 27 diverging from the central portion 25, parallel ray-indicating portions 28 that are slidably received in diametrically opposite openings 22 in the disc 18, and a rear portion 29 connecting the rear ends of the parallel portions and bent to form an opening 30 in which the rod 14 is slidably received. The rear, white indicator 24 is similarly formed, with arms spaced 45° from those of the indicator 23 with diverging loop portions 31, with parallel ray-indicating portions 32 slidably received in the other diametrically opposite openings 22 in the disc 18, which are at right angles to the openings in which the similar portions 28 of the indicator 23 are received, and with a rear portion 33 bent to form an opening 34 in which the rod 14 is slidably received.

It will be appreciated that, if desired, the indicators 23 and 24 may be in the form of a circular plate, instead of being merely four spaced arms, provided of course that the rear indicator plate 24 would have to be provided with suitable openings to receive the portions 27 and 28 of the indicator 23. In any case, the construction is such that the indicators 23 and 24 may be brought together, may be separated by a distance corresponding to a scale reading of about seven diopters, and may be rotated only in unison by reason of their support in the disc 18.

The indicators 23 and 24 are used to indicate the point (plus) behind the retina, which is represented by the zero line R on the scale, or the point (minus) in front of the retina, at which the principal rays represented by the pair of wires 28, or the pair of wires 32, would be focused. While the wire portions 27 and 31 do not, of course, correspond with the exact direction of the rays to the focus they serve to indicate that the parallel rays are bent to a focus and assist the subject or patient in visualizing the condition. The position of the slider 15 relative to the base 11 and its scale is not important, and the slider may be located at any point which permits the necessary movement of the indicators 23 and 24. It will be understood that the position of the wires 28 and 32 relative to the scale 15c indicate the angular position of the axis of a cylindrical refractive error of the eye or of a lens, and that, if the axis of a lens is, for instance, at 30° and the wires 28 or 32 therefor have been set at 30°, the disc 18 should be rotated 90° from such position and would then be read at 120°, because a cylindrical lens refracts at 90° from its axis.

In using the device to explain to a patient the refraction errors of an eye, after determination of the cylindrical correction and the spherical correction which will compensate for such errors, (1) both indicators 23 and 24 are brought to the zero line; (2) one or the other indicator 23 or 24 is moved to a setting on the diopter scale corresponding to the cylindrical correction (indicator 23 if the correction is plus and indicator 24 if the correction is minus and the indicator and disc 18 are rotated until the wires 28 or 32 of the indicator indicate on the scale 15b the axis of the cylindrical correction; (3) both indicators 23 and 24, with or without the slider 15, but while maintaining the spacing of such indicators 23 and 24, are moved until the indicator other than that first set reaches the setting on the diopter scale which corresponds to the spherical correction; (4) both indicators 23 and 24, together with the disc 18, are rotated 90°.

As an example of such use of the device for assisting in visualization, let us assume that for a particular eye it has been found that a cylindrical correction of plus 2.00 diopters with an axis of 165°, combined with a spherical correction of minus 0.50 diopter will correct the errors and is prescribed. Both indicators 23 and 24 are brought to the zero line. Indicator 23 is chosen to indicate the cylindrical correction because such correction is plus, and the cylindrical correction is always set before the spherical correction, and such indicator 23 is set at "plus 2.00" with its wire portions 28 rotated to 165°, the other indicator 24 remaining at the zero line. The indicators 23 and 24 are then moved together, preferably along with the slider 15, which will serve to assist in maintaining the spacing between the indicators 23 and 24, until the indicator 24 is set at "minus 0.50 diopter", which is the spherical correction. The two indicators 23 and 24 together with the disc 18 are then rotated 90°, in either direction. This is the position of the parts shown in the drawing, and from observation of the device, so set, the patient can visualize the extent and character of the errors of the eye, where the eye would tend to focus the rays relative to the retina, and how a compound lens can compensate for and correct such errors.

In using the device for transposing one combination of lens values to another, the device is operated by carrying out exactly the same steps as described heretofore, to illustrate and permit one to visualize the refractive errors of the eye. The device is then further manipulated to determine the two prescriptions, or combinations of lens values, which will correct such errors. For instance, with the values stated, the device was manipulated to bring all of the parts to the position shown in the drawing, to permit visualization of the eye condition, that is, with one indicator at plus 1.50, axis 75°, and the other indicator at minus 0.50, axis 165°. For such condition, one has a choice of two prescriptions, first, a minus 0.50 spherical correction combined with a plus 2.00 cylindrical correction at axis 165°, or, second, a plus 1.50 spherical correction combined with a minus 2.00 cylindrical correction at axis 75°. These prescriptions may be determined by further manipulation of the device, the different results being dependent upon which indicator is assumed to represent the sphere and which is assumed to represent the cylinder.

To obtain the first prescription, with the parts set as shown in the drawing, both indicators are moved simultaneously, maintaining their respective distance, until indicator 24 reaches the zero line R, which movement represents the spherical correction (minus 0.50), and then the two indicators, with the disc 18, are rotated 90°. It will then be noted that the indicator 23 is at "plug 2.00" diopters at axis 165°, which is the cylindrical correction necessary for this combination.

To obtain the values of the second prescription, starting with the parts set as shown in the drawing, both indicators are moved simultaneously, maintaining their respective distance, until indicator 23, instead of indicator 24, is brought to the zero line R, which movement represents the spherical correction (plus 1.50 diopter), and then the two indicators, with the disc 18, are rotated 90°, whereupon it will be noted that the indicator 24 is at "minus 2.00" diopters at axis 75°, which is the cylindrical correction necessary in this combination.

It will be noted that the first prescription described above, namely a cylindrical correction of plus 2.00 at axis 165° and a spherical correction of minus 0.50, is the one assumed above to describe the manipulation for visualization and that such manipulation left the parts set as shown in the drawing. It will therefore be apparent how, with a given prescription, the device may be manipulated to permit visualization of the existing errors of the eye and then, by considering as representing the spherical correction that indicator which was formerly assumed to represent the cylindrical correction, the device may be manipulated to determine the equivalent combination of lens values, which in the instance given above is a cylindrical correction of minus 2.00 at axis 75° combined with a spherical correction of plus 1.50.

The device may be used similarly to transpose a prescription for a combination of two cylindrical corrections at different axes, although such combinations are not usually prescribed, to the two equivalent combinations each for a spherical correction and a cylindrical correction. Likewise, as will be apparent, the device may be used, after measurement of a compound lens, and with the values so determined as a basis, to illustrate and facilitate visualization of the refractive errors such lens would correct, and may be used to transpose a prescription for a "distance" lens to one for a "near" lens in which a spherical correction is added.

Many other novel features and uses of the invention will be evident to those skilled in the art, and it is to be understood that the embodiment of the invention described is merely illustrative and that changes may be made in the details of structure without departing from the invention, which is defined in the following claims.

What is claimed is:

1. A device for computing and demonstrating refractive values and effects, comprising a body having a base line and a diopter scale extending perpendicular to said base line, a support guided for movement along said scale, and a pair of indicators carried by said support and movable independently relative to said support along said scale to cooperate with said scale to indicate various diopter values.

2. A device for computing and demonstrating refractive values and effects, comprising a body having a base line and a diopter scale extending perpendicular to said base line, a support guided for movement along said scale, a member rotatably carried by said support, and a pair of indicators mounted for movement independently of each other and independently of said support along said scale, said indicators and said member being rotatable as a unit about an axis parallel to the direction of extent of said scale.

3. A device of the character described, comprising a body provided with diopter scale designations, a support extending above said body, a member rotatably carried by said support, and a pair of indicators carried by said member and independently movable relative to said member to correspond with various of said scale designations.

4. A device of the character described, comprising a body, provided with a base line and with a diopter scale of values increasing in both directions from said base line along a line perpendicular thereto, a supporting member, and a pair of indicators carried by said supporting member and independently movable relative thereto along a line parallel to said scale.

5. A device of the character described, comprising a body, provided with a base line and with a diopter scale of values increasing in both directions from said base line along a line perpendicular thereto, a supporting member, and a pair of indicators carried by said supporting member and independently movable relative thereto along a line parallel to said scale, said supporting member and said indicators being movable as a unit about an axis parallel to said scale.

6. A device of the character described, comprising a body provided with a diopter scale extending in opposite directions from a base line, a support, a member rotatably carried by said support for rotation about an axis parallel to the line of extent of said diopter scale, a pair of indicators carried by said member and independently slidable relative thereto along said diopter scale, said member and said indicators being rotatable as a unit about an axis parallel to said scale, and means on said support and said indicators cooperating to indicate the angular position of said indicators.

7. A device of the character described, comprising a body provided with a diopter scale extending in opposite directions from a base line, a support having an angular scale thereon, a member rotatably carried by said support for rotation about an axis parallel to the line of extent of said diopter scale, and a pair of indicators carried by said member and independently slidable relative thereto along said diopter scale, each of said indicators comprising a portion registering with said diopter scale and with two parallel supporting portions passing through said member adjacent the angular scale on said support.

8. A device of the character described, comprising a body having a diopter scale extending in opposite directions from a base line, a support carried by said body and guided thereby for movement relative to said body in the direction in which said scale extends, a member rotatably carried by said support for rotation about an axis parallel to said scale, a pair of indicators carried by said member and independently slidable relative thereto along said axis of rotation, each of said indicators having parallel portions extending through said member, and a circumferential scale on said support adjacent the path of movement of said portions of said indicators.

9. A device for computing refractive values and effects, comprising a body having thereon a diopter scale extending in opposite directions from a base line, a member mounted on said body for sliding movement along said scale and for rotative movement about an axis parallel to said scale, and a pair of indicators slidably supported by said member for movement independently of each other and of said member in the direction of said axis.

JOHN S. DUNN.